Nov. 12, 1940.  A. E. LUKER  2,221,054
AUTOMOBILE HEADLIGHTING
Filed June 9, 1938
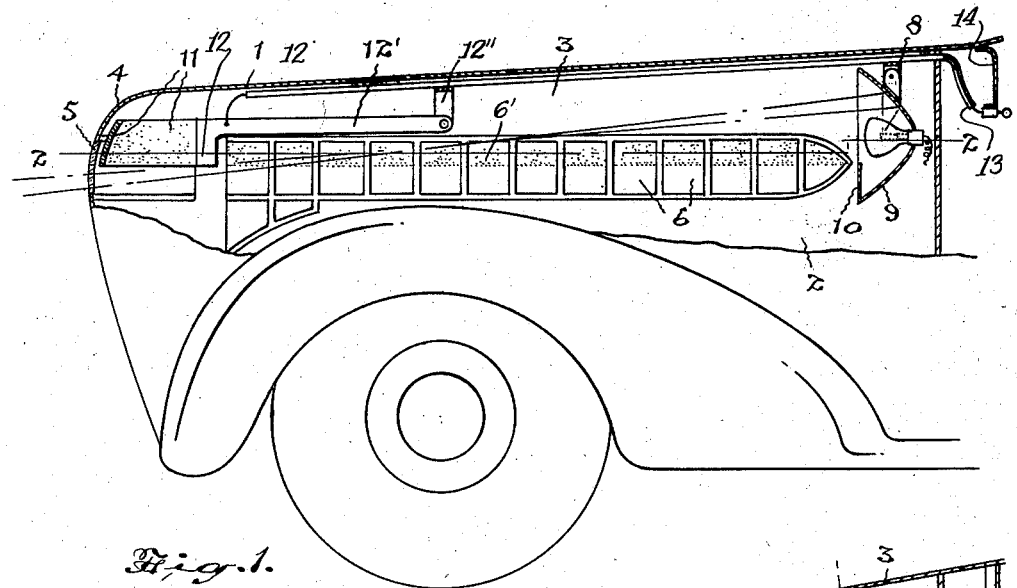
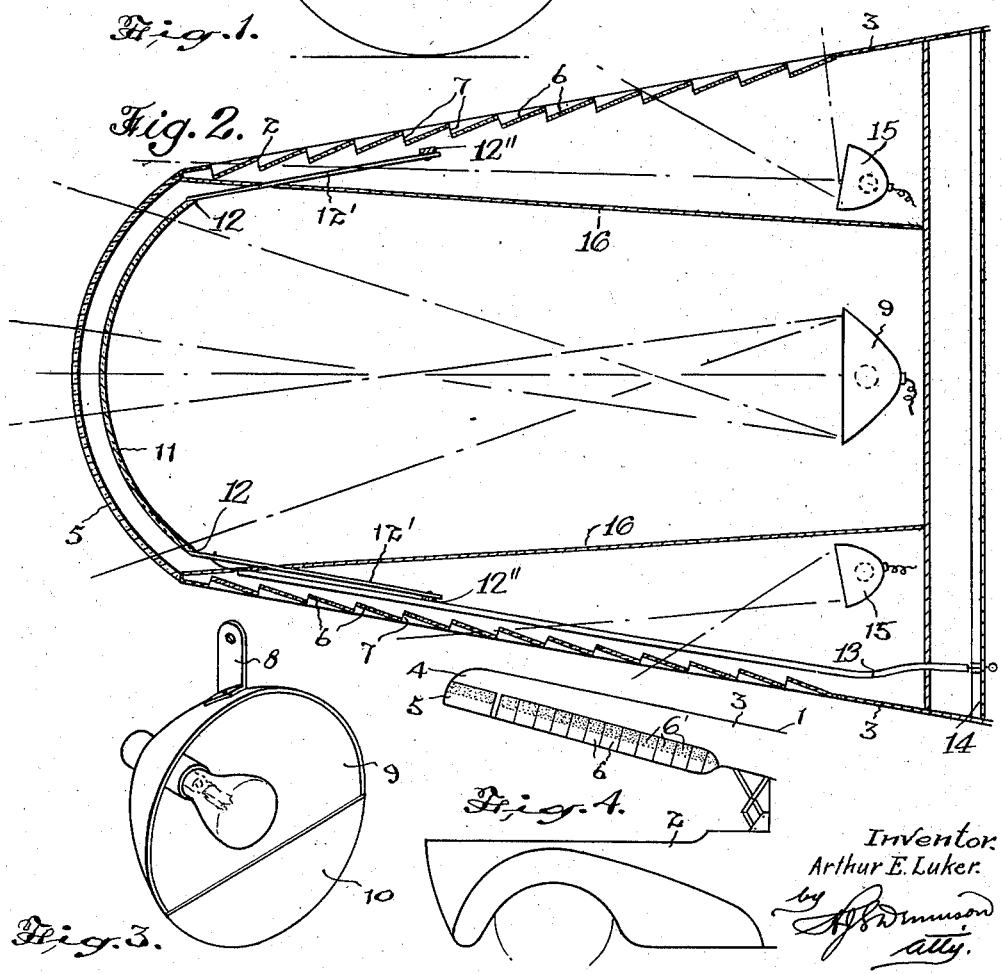
Inventor
Arthur E. Luker Patented Nov. 12, 1940

2,221,054

UNITED STATES PATENT OFFICE 2,221,054

AUTOMOBILE HEADLIGHTING

Arthur E. Luker, Lorne Park, Ontario, Canada

Application June 9, 1938, Serial No. 212,680

4 Claims. (Cl. 240—8.11)

This invention relates to the means for projecting light forwardly from a motor vehicle to illuminate the road ahead of the vehicle and to distribute illumination either side thereof and the principal objects are to provide a lighting equipment which avoid the projection of light glare which is dangerous to drivers of approaching vehicles while affording ample illumination of the road for safe driving, and further to illuminate the front of the vehicle so that it will present an appearance in the dark other than a pair of glaring lights which will enable approaching traffic to definitely determine its location on the road.

A further and important object is to completely obviate the dangers incident to the failure of either of a pair of head lights.

A still further object is to impart a novel and attractive appearance to the vehicle which will be both pleasing and useful.

The principal features of the invention consist in the novel arrangement of reflector lamps within the engine hood of the vehicle and in the construction of the hood with substantially horizontal openings therein, whereby a broad flat sheet of light having a clearly defined and controlled upper horizontal line is projected therefrom both forwardly and laterally.

In the accompanying drawing—

Figure 1 is a part sectional and side elevation of the front portion of a motor car illustrating the application of the present invention thereto.

Figure 2 is a horizontal plan section of the engine hood of the car taken on the line 2—2 of Figure 1.

Figure 3 is an enlarged perspective detail of one of the reflector lamps.

Figure 4 is a side elevation, on a small scale, of the engine hood with its cover shown in a raised position.

In the present day motor car it is practically the universal practice to arrange a pair of headlights, one at either side either mounted on the radiator shell or engine hood or in or on the fenders and a minor accident or mishap may easily disturb the location of either headlight so that it will be thrown out of alignment and cause the beam of light to be elevated at such an angle as to be extremely dangerous in blinding approaching traffic, as well as damaging its own road lighting efficiency.

It has been previously proposed to place the head lamps within the engine compartment and project the light through lenses arranged either side of the radiator or to project the light through an opening in the radiator, but neither of these proposals have been found practical.

According to the present invention, I prefer to utilize the latest form of engine hood design and construction in which the cover 1 of the engine hood 2 is hinged so as to be lifted at its front end and said cover extends over both engine and radiator with considerable clearance.

In the construction I prefer, the engine hood and cover are formed with side walls 3 converging forwardly to a rounded front end 4 and a curved glass panel 5 is suitably secured to and depends from the rounded end 4. This panel is preferably formed of clear glass and it forms a light opening which extends completely across the front end of the hood.

Along the sides of the cover I arrange glass panels 6 which are preferably aligned horizontally with the front panel 5 and extend practically the full length of the hood. These side panels may be arranged in the form of louvers 7 to permit ventilation of the engine hood and they are preferably formed with the upper half frosted or of an otherwise translucent nature as shown at 6'.

Brackets 8 are arranged to extend downwardly from the cover 1 adjacent to the rear end, one being arranged centrally of the width and others being arranged adjacent to the sides.

Secured to and supported from the centre bracket 8 is a reflector lamp 9 which may be provided with a front lens but which is provided with a shield 10 covering the lower portion up to a line substantially level with the longitudinal centre line of the side and front panels. This shield prevents rays of light reflected from the lower section of the reflector, being projected forwardly and upwardly through the panel 5 at the front or through the upper half 6' of the side panel louvers.

The rays of light projected forwardly from the reflector above the shield 10 extend over the engine and radiator both horizontally and downwardly, thus projecting a fan-shaped sheet of light, the top of which is cut horizontally by the top edge of the light opening formed by the glass panel 5.

I provide a shield member 11 preferably in the form of translucent glass, curved to correspond to the curvature of the shield 5. This is supported on a frame 12, the side arms 12' of which are pivoted on supports 12" extending from the cover 1. The shield 11 may be raised or lowered to expose the full area of the panel 5 to the light rays of the reflector lamp to permit a long distance range of light, or it may be lowered any desired degree by any suitable device, the means for operating same being here shown as a "Bowden" wire control 13 from the instrument board 14.

It will be readily understood that the lamp used may be either a single or double filament lamp, but if a double filament lamp is used to give a powerful driving light, it is preferred that such filaments be arranged in horizontal alignment so that when either one or both filaments are used, the light reflection will not be altered vertically, but by manipulation of a switch, the filament directing the strongest rays outward, i. e. away from approaching traffic, will reduce the strength of the projected light in their direction.

A certain amount of light projected from the centre reflector will illuminate the side panels 6, but I prefer to arrange two smaller reflector lamps 15, one at either side of the centre lamp 9 and these are preferably focussed to direct their rays angularly outward through the side panels. The translucent upper half 6' of these panels prevent "glare" rays being projected forwardly and shields similar to the shield 10 described are preferably arranged at the bottom of each lamp 15.

Longitudinal light shields 16 are here shown arranged to extend down from the cover, as indicated in Figure 2, to intensify the laterally directed light.

The light directed through the side panels 6 spreads laterally in flat sheets either side of the car and not only illuminates the road sides, but lights up the fenders and other external parts of the car in addition to displaying a broad light band extending across the front and along the sides of the engine hood. This not only illuminates the car to the advantage of traffic approaching from ahead, but shows the car in strong relief to cars approaching on cross traffic.

A motor car lighted in the manner described will not only render it fully visible to outside traffic, but it will spread a low flat area of illumination to the distinct advantage of the driver, and its side lighting facilities will be a marked advantage in observing pedestrians at the side of the road.

Besides the driving advantages herein set forth, the housing of the lamps within the engine compartment will ensure their protection in accidents and a further distinct advantage is found in the saving in installation, as well as in maintenance, as all wiring will be grouped under cover of the car body and will be remarkably free from corrosion and damage through contact with water and the effects of frost in winter. Further the removal of lamps from the outer surfaces of the car will reduce wind resistance and enable a wide range of variation in body designs.

What I claim as my invention is:

1. An automobile having a horizontal light opening extending across its front and along its sides, a transparent panel closing the front opening, transparent louvers arranged in said side openings, a centre reflector lamp within the hood projecting light rays through said front opening, side reflector lamps arranged in said hood directing light rays diagonally laterally through said louvers, and a translucent member mounted in said hood adapted to obstruct light rays directed toward the upper portion of said front opening.

2. An automobile having in combination a hinged hood cover, a transparent panel secured to the front of said cover, transparent panels extending downwardly from the sides of said cover in substantial horizontal alignment with the aforesaid panel, and reflector lamps mounted in said cover and projecting light rays through said transparent panels, said side panels being transparent below a predetermined horizontal plane and of light-diffusing character above said plane, at least one of said reflector lamps being located with its light axis above said plane and with its reflector extending below said plane and having a shield extending upwardly from the lower rim and presenting an upper terminal edge in alignment with said plane.

3. An automobile having in combination a horizontal light opening extending across its front and along its side walls, a transparent panel closing the front opening, transparent louvers extending inwardly from said side wall openings spaced apart in acute forwardly diverging relation to the side walls leaving the outer areas thereof substantially flush and protecting said louvers from breakage, and means for directing concentrated light rays substantially horizontally through said front opening and laterally through said louvers.

4. An automobile having in combination a horizontal light opening extending across its front and along its sides, a transparent panel closing the front opening, transparent louvers arranged in said side openings, means for directing concentrated light rays substantially horizontally through said front opening and laterally through said louvers, said transparent louvers comprising transparent panels disposed inwardly from said side opening in stepped progression and so related as to permit passage of air therebetween but to prevent direct passage of the concentrated light rays therebetween.

ARTHUR E. LUKER.